(12) United States Patent
Yang et al.

(10) Patent No.: US 11,908,344 B1
(45) Date of Patent: Feb. 20, 2024

(54) THREE-DIMENSIONAL (3D) INTEGRATED TEACHING FIELD SYSTEM BASED ON FLIPPED PLATFORM AND METHOD FOR OPERATING SAME

(71) Applicant: Central China Normal University, Wuhan (CN)

(72) Inventors: Zongkai Yang, Wuhan (CN); Zheng Zhong, Wuhan (CN); Di Wu, Wuhan (CN); Xu Chen, Wuhan (CN)

(73) Assignee: Central China Normal University, Wuhan (CN)

( * ) Notice: Subject to any disclaimer, the term of this patent is extended or adjusted under 35 U.S.C. 154(b) by 0 days.

(21) Appl. No.: 18/484,309

(22) Filed: Oct. 10, 2023

(30) Foreign Application Priority Data

Oct. 24, 2022 (CN) .......................... 202211304555.6

(51) Int. Cl.
*G09B 5/06* (2006.01)
*G06T 17/00* (2006.01)
(Continued)

(52) U.S. Cl.
CPC ............. *G09B 5/065* (2013.01); *G06F 3/017* (2013.01); *G06T 7/246* (2017.01); *G06T 7/70* (2017.01);
(Continued)

(58) Field of Classification Search
CPC . G09B 5/065; G09B 5/10; G09B 5/14; G03H 2226/05; G06F 3/017; G06V 40/166; G06V 40/174; G06V 40/28; G06V 20/70; G06T 7/246; G06T 7/70; G06T 17/00; G06T 2207/20044; G06T 2207/20084
See application file for complete search history.

(56) References Cited

U.S. PATENT DOCUMENTS

| | | | |
|---|---|---|---|
| 11,556,183 B1* | 1/2023 | Li | ........................... G06F 3/017 |
| 2013/0222565 A1* | 8/2013 | Guerin | ................. A63F 13/211 |
| | | | 348/77 |

(Continued)

FOREIGN PATENT DOCUMENTS

| CN | 207115783 U | 3/2018 |
|---|---|---|
| CN | 111445524 A | 7/2020 |

(Continued)

OTHER PUBLICATIONS

Lim et al. "Realizing the metaverse with edge intelligence: A match made in heaven." IEEE Wireless Communications (2022). (Year: 2022).*

(Continued)

*Primary Examiner* — Katrina R Fujita

(57) ABSTRACT

This application relates to teaching applications of virtual reality technology, and provides a three-dimensional (3D) integrated teaching field system based on a flipped platform and a method for operating the same. The system includes a device deployment module, a teaching resource matching module, an acquisition and processing module and an edge computing module. The method includes spatial division of the 3D comprehensive teaching field system in an offline classroom, device deployment, edge computing, holographic display, data acquisition, motion positioning, and construction of a teaching interactive environment.

11 Claims, 5 Drawing Sheets

(51) Int. Cl.
  *G06T 7/246* (2017.01)
  *G06T 7/70* (2017.01)
  *G06V 40/16* (2022.01)
  *G06V 40/20* (2022.01)
  *G06V 20/70* (2022.01)
  *G06F 3/01* (2006.01)
  *G09B 5/14* (2006.01)
  *G09B 5/10* (2006.01)

(52) U.S. Cl.
  CPC .............. *G06T 17/00* (2013.01); *G06V 20/70* (2022.01); *G06V 40/166* (2022.01); *G06V 40/174* (2022.01); *G06V 40/28* (2022.01); *G03H 2226/05* (2013.01); *G06T 2207/20044* (2013.01); *G06T 2207/20084* (2013.01); *G09B 5/10* (2013.01); *G09B 5/14* (2013.01)

(56) References Cited

U.S. PATENT DOCUMENTS

| | | | | |
|---|---|---|---|---|
| 2021/0090608 | A1* | 3/2021 | Zhang | G06V 20/46 |
| 2021/0225186 | A1* | 7/2021 | Yang | G06V 40/171 |
| 2022/0031199 | A1* | 2/2022 | Hao | G16H 50/70 |
| 2022/0374629 | A1* | 11/2022 | Wu | G06F 3/017 |
| 2022/0415197 | A1* | 12/2022 | Haddish | G06F 3/043 |
| 2023/0290266 | A1* | 9/2023 | Jia | G09B 19/0053 434/118 |

FOREIGN PATENT DOCUMENTS

| | | | | |
|---|---|---|---|---|
| CN | 112562433 A | | 3/2021 | |
| CN | 113593351 A | | 11/2021 | |
| CN | 114067622 A | | 2/2022 | |
| KR | 102217783 | * | 2/2021 | .............. G09B 5/14 |

OTHER PUBLICATIONS

Tang et al. "Pose detection in complex classroom environment based on improved Faster R-CNN." IET Image Processing 13.3 (2019): 451-457. (Year: 2019).*

* cited by examiner

THREE-DIMENSIONAL (3D) INTEGRATED TEACHING FIELD SYSTEM BASED ON FLIPPED PLATFORM AND METHOD FOR OPERATING SAME

CROSS-REFERENCE TO RELATED APPLICATIONS

This application claims the benefit of priority from Chinese Patent Application No. 202211304555.6, filed on Oct. 24, 2022. The content of the aforementioned application, including any intervening amendments thereto, is incorporated herein by reference in its entirety.

TECHNICAL FIELD

This application relates to application of virtual reality technology in the field of teaching, and more particularly to a three-dimensional (3D) integrated teaching field system based on a flipped platform and a method for operating the same.

BACKGROUND

The three-dimensional (3D) integrated teaching field can realize the deep integration of "human-machine-field" and allow the teaching activities for teachers and students in an environment integrating real physical space and virtual teaching resources. With the in-depth application of new technologies (such as, 5G, artificial intelligence, holographic display and virtual reality) in the education scene, teachers use gestures, body sensation, touch and other multi-modal interaction to manipulate virtual teaching resources by virtue of collaborative work of acquisition sensors, display terminals and interactive devices. The results of the interaction between the real teacher and the virtual resources are presented on the holographic screen. It has been possible to deploy the 3D integrated teaching field system to the offline physical classroom. In such situations, the traditional platform will be flipped, and the superposition and integration of a real teacher, virtual teaching resources and the classroom environment will be created, which can enhance the concentration and participation sense of students during the teaching process and create a new form integrating information technology and curriculum teaching, thereby promoting the further development of the blended teaching mode under the environment of the smart classroom.

Unfortunately, the currently-constructed 3D comprehensive teaching field system in the offline classroom is still limited by the following shortcomings:

(1) Undesirable Holographic Presentation of Real Teachers and Virtual Resources

The virtual teaching content is rotated 180° when viewed by teachers and students at two sides of the holographic screen. To ensure the teaching effect, teachers are usually required to reversely operate the virtual teaching resources during the teaching process, which poses high requirements for the ability of mental imaging and mental rotating of the teachers and therefore increases the cognitive difficulty.

(2) Insufficient Sense of Reality of the Fusion and Superposition of Virtuality and reality Although the current individual technologies (such as real-time modelling and holographic display) tend to be mature, the fusion display of real teachers and virtual resources is still struggled in integration, which directly affects the sense of reality of the display effect.

(3) Elaborate Design of Multimodal Data Processing Module

To meet the need for privacy protection in teaching, edge computing servers should be deployed in the school to avoid the teaching video and video action data from leaking out of the school. These defects limit the application of the 3D comprehensive teaching field system in offline classrooms.

SUMMARY

To solve the above deficiencies or improvement requirements, the present disclosure provides a 3D integrated teaching field system based on a flipped platform and a method for operating the same, which provides a new and more realistic method for the space division, equipment deployment, edge computing, holographic display, data acquisition, motion positioning, and construction of teaching interactive environment for the 3D integrated teaching field system in the offline classroom.

The technical solutions of the present disclosure are described below.

In a first aspect, this application provides a 3D comprehensive teaching field system based on a flipped platform, comprising:
  a device deployment module;
  a teaching resource matching module;
  an acquisition and processing module; and
  an edge computing module;
  wherein the device deployment module is configured to deploy displaying, acquiring, computing and interactive devices and a lighting system in a teaching activity area in a classroom to support the 3D integrated teaching field system;
  the teaching resource matching module is configured to select a teaching resource according to an instruction requested by a user in accordance with a weighting order of parameters, and realize a loading service of virtual teaching resources along a cloud-edge-end link based on local caching, hot updating by using an edge computing server, and cloud batch updating;
  the acquisition and processing module is configured to acquire environment of the teaching activity area and point cloud sequence data of a teacher using a red-green-blue-depth (RGB-D) camera, extract skeleton data of the teacher using a Mask region-based convolutional neural network (R-CNN) algorithm on the edge computing server, and feed the skeleton data back to a local processing module to extract skeletal joint points of the teacher and coordinates of the skeletal joint points of the teacher to perform grouping of the skeletal joint points; and
  the edge computing module is configured to receive the point cloud sequence data obtained by the acquisition and processing module, calculate and label the skeletal joint points of the teacher, analyze a motion trajectory of the skeletal joint points, detect states of the teacher in the teaching activity area, and track teaching behaviors of the teacher and changes thereof.

In an embodiment, the 3D integrated teaching field system comprises a positioning module, wherein the positioning module is configured to construct a virtuality-reality fusion coordinate system, determine position, posture and scaling factor of a holographically-displayed content, determine position information and posture information of the skeleton of the teacher, and position an interaction command based on the motion trajectory of the skeletal joint points of the teacher.

In an embodiment, the 3D integrated teaching field system comprises a display module, wherein the display module is configured to push a virtual teaching content screen rendered by the edge computing server to a local area, update a virtual teaching resource screen on a holographic screen according to observation parameters of the teacher, and realize fusion and display of the virtual teaching content screen and the virtual teaching resource screen according to position and interaction relationship between the teacher and the virtual teaching resources.

In an embodiment, the 3D integrated teaching field system comprises an interaction module, wherein the interaction module is configured to recognize a teaching style of the teacher based on the motion trajectory, connection relationships and change sequence of the skeletal joint points of the teacher, recognize a multi-sensory action input by the teacher, convert the multi-sensory action into an interaction command to drive the virtual teaching resources to perform operations, and update a screen of holographically-displayed content.

In a second aspect, this application provides a method for operating the aforementioned 3D integrated teaching field system, comprising:

(S1) dividing a classroom into the teaching activity area of the teacher and a student activity area with a division wall embedded with a holographic film and an entry door; constructing a 3D teaching field system for the classroom using an electronic sand table, the edge computing server, a holographic imaging device and lights; and deploying a depth, sound, motion capture and touch sensing device in the teaching activity area;

(S2) selecting a teaching resource according to subjects, grades, textbook versions and knowledge points requested by the user in accordance with a weighting order of terminal, resolution and ratio; constructing the cloud-edge-end link to download the virtual teaching resources according to requests of the user; and realizing the loading service of the virtual teaching resources according to the local caching, the hot updating by using the edge computing server, and the cloud batch updating;

(S3) acquiring, by the RGB-D camera, background, texture, depth and point cloud of the teaching activity area; uploading the background, the texture, the depth and the point cloud to the edge computing server; extracting the skeleton data of the teacher using the Mask R-CNN technology; and extracting, in the local processing module, the coordinates of skeleton and skeletal joint points of the teacher using a segmentation strategy to perform the grouping of the skeletal joint points based on a hierarchical control principle;

(S4) receiving the point cloud sequence data obtained by the acquisition and processing module; calculating and labeling the skeletal joint points of the teacher using the nonlinear solver; analyzing the motion trajectory of the skeletal joint points using a neural network algorithm according to moving speeds and moving angles of the skeletal joint points; and detecting the states of the teacher in the teaching activity area to track the teaching behaviors of the teacher and the changes thereof;

(S5) constructing a virtuality-reality fusion coordinate system; determining position, the posture and the scaling factor of a holographically-displayed content according to internal and external parameters of a hologram projector; locating position information and the posture information of the skeleton of the teacher in the virtuality-reality fusion coordinate system, in combination with an inverse perspective transformation equation; and determining an interaction command based on the motion trajectory of the skeletal joint points of the teacher, wherein the interaction commands comprise clicking, dragging, drop, hauling and pulling;

(S6) rendering the holographic display content on the edge computing server using a cloud rendering teaching service mode; updating a virtual teaching resource screen displayed on the holographic screen based on body positions, head postures and sight lines of the teacher; fusing and displaying the virtual teaching content screen and the virtual teaching resource screen according to position and interaction relationship between the teacher and the virtual teaching resources; and (S7) recognizing a teaching style of the teacher based on the motion trajectory, connection relationships and change sequences of the skeletal joint points of the teacher; recognizing a multi-sensory action input by the teacher, wherein the multi-sensory action comprises eye movements, body movements and gesture actions; converting the multi-sensory actions into the interaction commands; and driving the virtual teaching resources to perform operations to update a screen of the holographically-displayed content, wherein the operations comprise moving, zooming and rotating.

Compared with the prior art, this application has the following beneficial effects.

In this application, a teaching field system based on a flip platform is constructed. A classroom is divided into a teaching activity area and an activity area of the student using a division wall embedded with a holographic film. A 3D teaching field system for the classroom is constructed using displaying, acquiring and computing interactive devices and lighting systems. The loading service of virtual teaching resources is realized along a cloud-edge-end link based on local caching, hot updating by an edge computing server, and cloud batch updating. Environment of the activity area and point cloud sequence data of the teacher are acquired using a red-green-blue-depth RGB-D camera. Skeleton data of the teacher are extracted in an edge computing server using Mask R-CNN technology, and are returned to a local processing module to extract coordinates of skeleton and skeletal joint points of the teacher to group the skeletal joint points. The point cloud sequence data obtained by the acquisition and processing module are received. The skeletal joint points of the teacher are calculated and labeled. A motion trajectory of the skeletal joint points is analyzed. States of the teacher in the teaching activity area are detected, and teaching behaviors of the teacher and changes thereof are tracked. A virtuality-reality fusion coordinate system is constructed. Position, posture and scaling conversion coefficients of a holographic displaying content are determined. Position information and posture information of the skeleton of the teacher are located. Interaction commands are positioned based on the motion trajectory of the skeletal joint points of the teacher. A first screen of virtual teaching content rendered by the edge computing server is pushed to a local area. A second screen of virtual teaching resource on a holographic screen is updated according to observation parameters of the teacher, and the fusion and display of the first screen and the second screen are realized according to position and interaction relationship between a real teacher and the virtual teaching resources. A teaching style of the teacher is recognized based on the motion trajectory, connection relationships and change sequences of the skeletal joint points of the teacher. Multi-sensory actions input by the teacher are recognized and converted into interaction commands to drive the virtual teaching resources to perform operations, and update a screen of holographic display content. With the advancement of new infrastructure in education, 5G education private networks are deployed and implemented in colleges and universities, vocational schools, primary and secondary schools. The 3D teaching field system for the offline classroom is able to meet the needs of personalized and contextualized teaching, which contributes to the implementation of a new intelligent teaching environment in the physical classroom.

Figure 1:
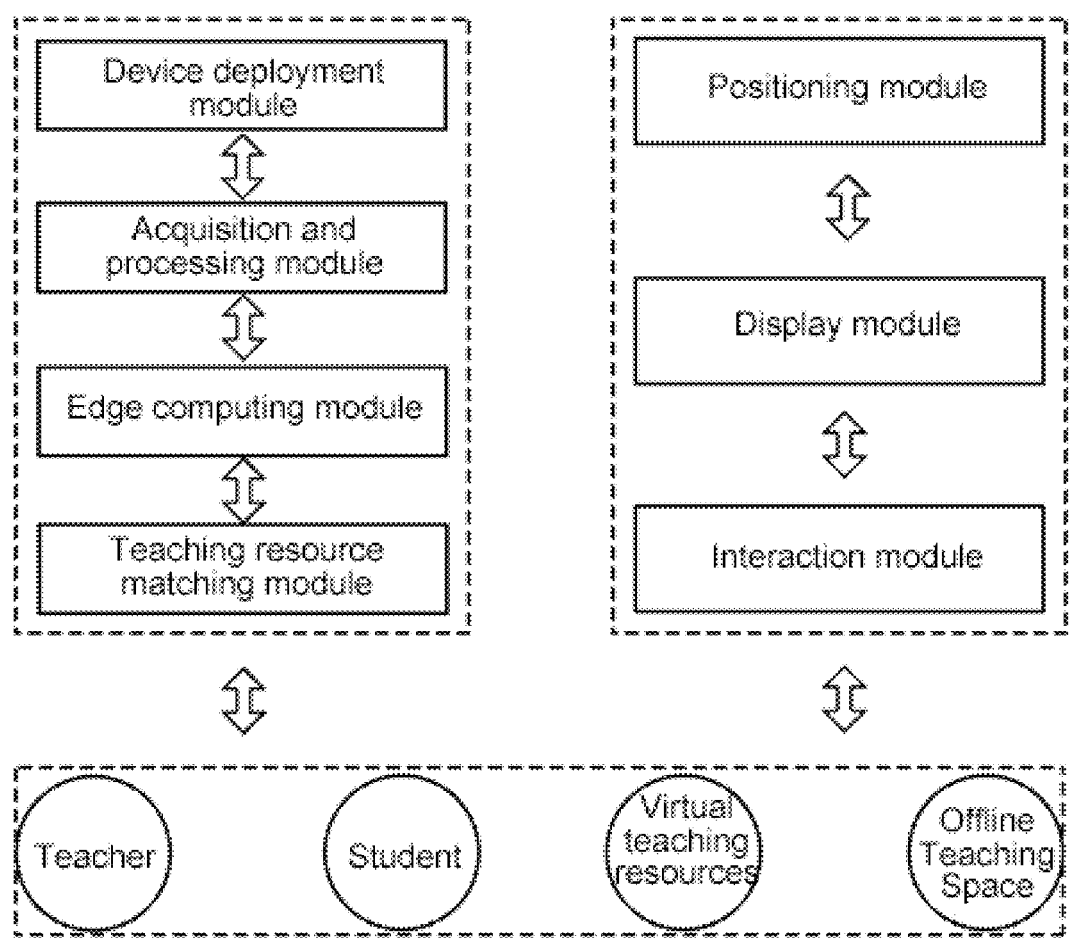
FIG. 1 is an architecture diagram of a three-dimensional (3D) integrated teaching field system based on a flip platform according to an embodiment of the present disclosure.

In the drawings, 200, teaching activity area; 201, activity area of a student; 202, electronic sand table; 203, holographic film; 204, holographic projector; 205, LED lamp; 206, flat soft light; 207, entry door; and 208, red-green-blue-depth (RGB-D) camera;

301, side wall of the classroom; 302, floor of the classroom; 303, infrared motion capture device; and 304, electronic sand table;

400, nose; 401, neck; 402, right shoulder; 403, right elbow; 404, right wrist, 405, left shoulder; 406, left elbow; 407, left wrist; 408, right bottom; 409, right knee; 410, right ankle; 411, left bottom; 412, left knee; 413, left ankle; 414, right eye; 415, left eye; 416, right ear; and 417, left ear; and 500, nose; 501, neck; 502, right shoulder; 503, right elbow; 504, right wrist; 505, left shoulder; 506, left elbow; 507, left wrist; 508, left eye; and 509, right eye.

DETAILED DESCRIPTION OF EMBODIMENTS

To make the objects, technical solutions and advantages of the present disclosure clearer and more understandable, the present disclosure will be described in further detail hereinafter in conjunction with the accompanying drawings and embodiments. It should be understood that the specific embodiments described herein are merely for explaining the present disclosure and are not intended to limit the present disclosure. In addition, the technical features involved in the various embodiments of the present disclosure described below may be combined with each other as long as there are no conflicts.

As shown in FIG. 1, a three-dimensional (3D) integrated teaching field system based on a flipped platform is provided, which includes a device deployment module, a display module, an acquisition module, a positioning module, an interaction module and an edge computing module.

A method for implementing the aforementioned 3D integrated teaching field system is also provided, which includes the following steps.

(S1) Environment Deployment in a Classroom

The classroom is divided into an activity area of a teacher and an activity area of a student using a division wall embedded with a holographic film and an entry door. A 3D teaching field system for the classroom is constructed using an electronic sand table, the edge computing server, a holographic imaging device and lights. A depth, sound, motion capture and touch sensing device is deployed in the teaching activity area.

(S1-1) Division of Functional Regions

Figure 2:
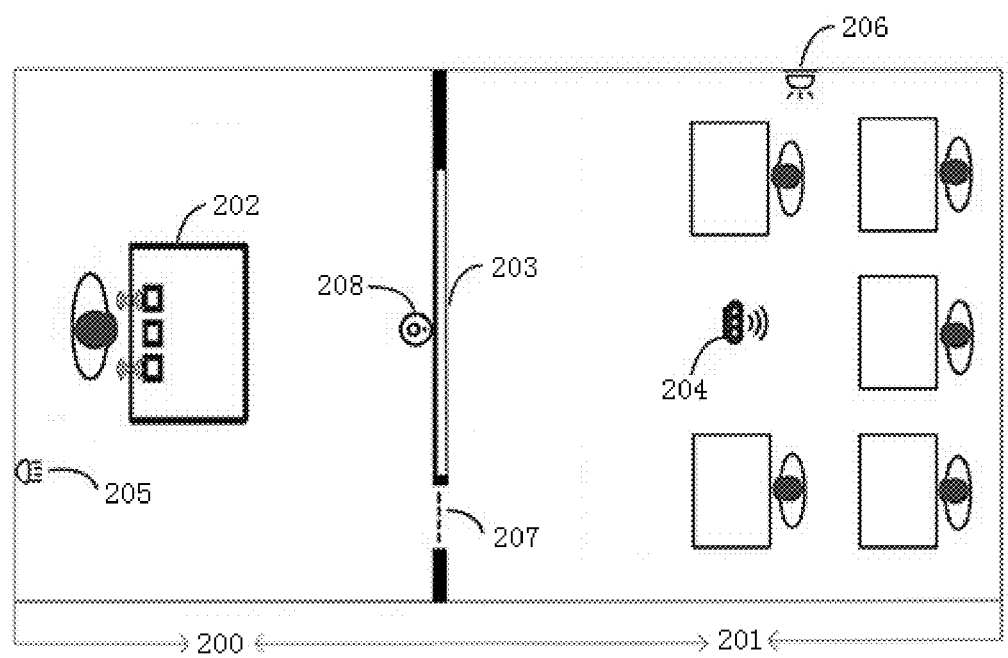
FIG. 2 is a schematic diagram of deployment of the 3D integrated teaching field system in a classroom according to an embodiment of the present disclosure.

As shown in FIG. 2, the division wall is arranged 3 m in front of a blackboard or an electronic whiteboard in the classroom, so as to divide the classroom into two areas, i.e., the teaching area 200 of the teacher and the activity area 201 of the student, where the division wall is embedded with a glass screen attached with the holographic film 203 and the entry door 207; the teaching area 200 of the teacher is located inside the division wall and near the blackboard, and the activity area 201 of the student is located outside the division wall. The teacher is capable of talking with the student face to face by walking to the activity area of the students from the teaching activity area through the entry door.

(S1-2) Construction of a Holographic Display Environment

The glass screen embedded in the division wall is configured to present fusion effect of the virtual teaching resources and the real teacher. The holographic film is a near invisible light-splitting film with a light transmittance of greater than 98.8% and a reflectivity of more than 92%, which can achieve virtual imaging while maintaining the brightness of the light source and the color reproduction degree after used in combination with the light source panel. An ultra-short-focus holographic projector 204 is installed in a middle of a top of the activity area of the student, with an initial position being set in a middle of a mobile guide rail, which can achieve holographic capture and playback of sound/video together with the radio and amplification modules. LED lamps and LED flat soft lights are used as light sources according to needs of teacher's operation in the teaching activity area and students' viewing in the activity area of the student, respectively, where the LED lamps and the LED flat soft lights are different in brightness.

(S1-3) Arrangement of Interactive Devices

The edge computing server, the electronic sand table and network environment are deployed in the teaching activity area. During the teaching process, the electronic sand table 202 is configured to load and control teaching sources. The RGB-D camera 208 integrating time-of-flight (TOF) depth, microphone circular array and inertial measurement unit is arranged on a top of the teaching activity area, to collect voice, mouth shapes and the body movements of the teacher.

(S2) Adaptation of Teaching Resources

Compatible teaching resources are matched according to subjects, grades, textbook versions and knowledge points requested by the user in accordance with a weighting order of terminal, resolution and ratio. The cloud-edge-end link is constructed to download the virtual teaching resources according to requests of the user. The loading service of the virtual teaching resources is realized according to the local caching, the hot updating by the edge computing server, and the cloud batch updating.

(S2-1) Matching of the Teaching Resources

A knowledge tree model of the teaching resources is established according to the subjects, grades, the textbook versions, chapters and the knowledge points. The teaching resources are attached to the knowledge tree model according to media types, and adaptable terminals, screen sizes and aspect ratios are assigned to the teaching resources. The most compatible teaching resources are determined according to user's requests in the weighting order of the terminal, the resolution, and ratio attributes.

(S2-2) Construction of the Cloud-Edge-End Link

The cloud-edge-end link is constructed using the MEC architecture. A rendering and teaching service module of the 3D comprehensive teaching field is deployed in the cloud to realize services of user information, resource matching and function validation. The edge computing server is deployed in a school to which the classroom belongs to, so as to realize services of screen rendering, edge computing and resource updating. The virtual teaching resources are downloaded from a classroom end based on instruction requests issued by the teacher; and (S2-3) Loading Service of the Teaching Resources A request for loading the teaching resource is sent from a teaching application of the electronic sand table according to teaching objectives and teaching content requirements. The specific implementing steps are described as follows:
- (I) the most compatible virtual teaching resources are obtained based on step (S2-1);
- (II) whether the local cache exists is determined through data dictionary mapping according to the name of the virtual teaching resources: if yes, go to step (IV); and otherwise, go to step (III);
- (III) the teaching resources are loaded from the edge computing server through hot updating, and if the teaching resources do not exist, the course teaching resource of the corresponding discipline is extracted from the virtual teaching resource library; and
- (IV) the teaching resources are loaded on the electric sand table.

(S3) Acquisition and Processing

Figure 3:
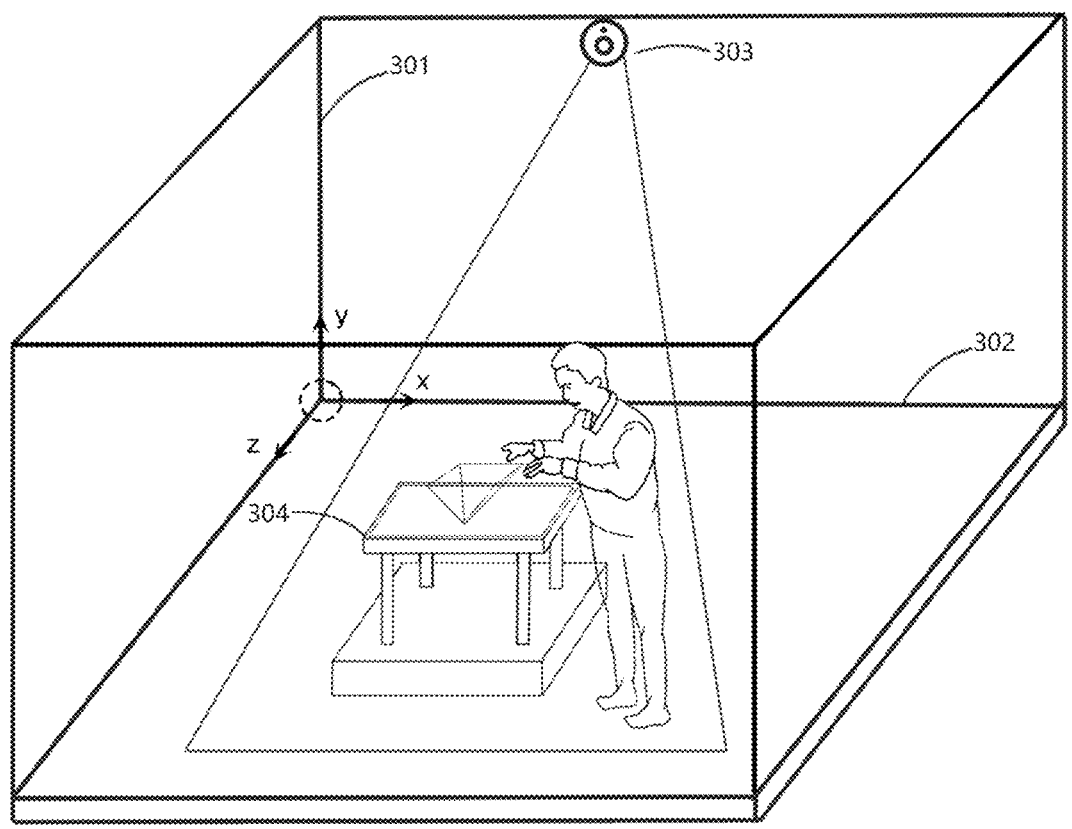
FIG. 3 is a schematic diagram of position of a teacher using an infrared motion capture device according to an embodiment of the present disclosure.

Background, texture, depth and point cloud of the teaching activity area are acquired by the RGB-D camera and are uploaded to the edge computing server. The skeleton data of the teacher are extracted using the Mask R-CNN technology. The coordinates of skeleton and skeletal joint points of the teacher are extracted using a segmentation strategy in the local processing module to group the skeletal joint points based on a hierarchical control principle (S3-1) Collection of Teaching Information As shown in FIG. 3, a field mode of the RGB-D camera is set to a narrow view, with a central field area front of the electronic sand table. Background environment of the teaching activity area and texture images and depth point cloud sequence data of the teacher are accurately acquired during the teaching process, and are transmitted to the acquisition and processing module on the electronic sand table through Bluetooth, WIFI or USB 3.0.

(S3-2) Extraction of Skeleton Data of the Teacher

Figure 4:
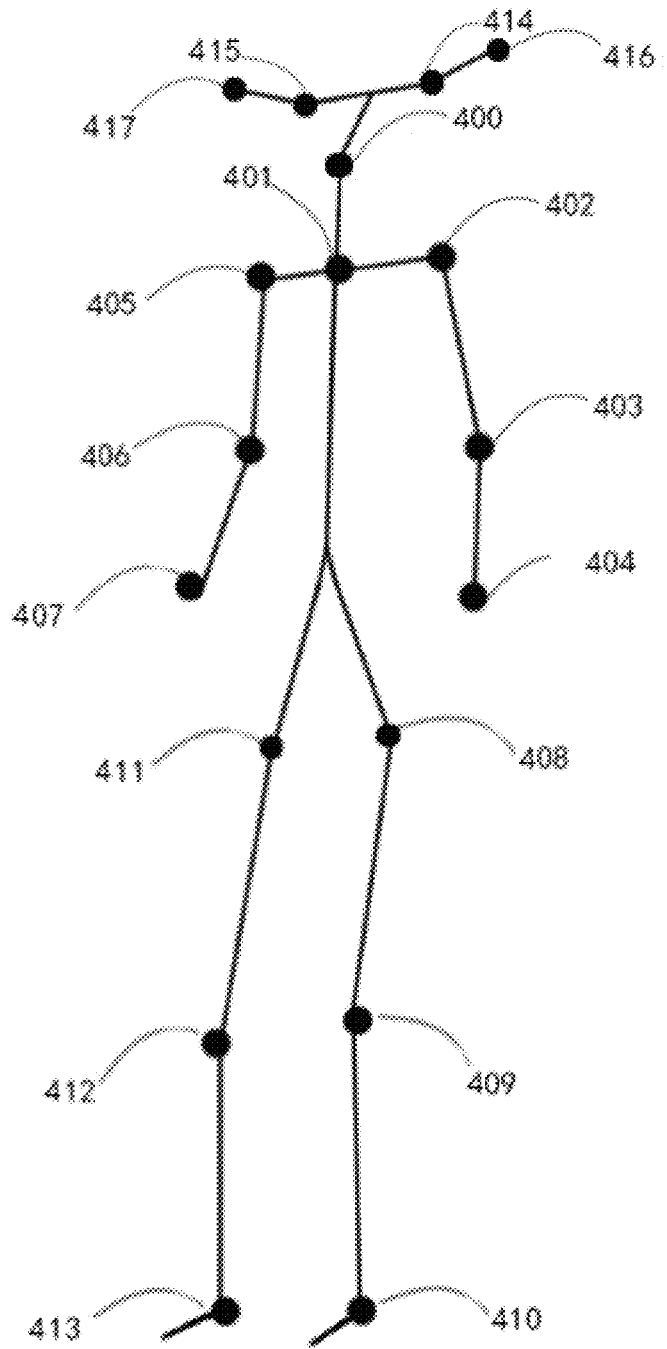
FIG. 4 is a schematic diagram of grouping of skeleton of the teacher according to an embodiment of the present disclosure.

The depth point cloud sequence data captured by the RGB-D camera are sent to the edge computing server by the acquisition and processing module according to time sequence. A two-dimensional (2D) confidence map and an association field of a transformed image are extracted using the Mask R-CNN neural network technology, and the connection between the 2D confidence map and the association field is solved using bipartite matching in graph theory. The skeleton data of the teacher in the point cloud sequence data are positioned and extracted. The joint points of the teacher as shown in FIG. 4 are determined, i.e., nose 400, neck 401, right shoulder 402, right elbow 403, right wrist 404, left shoulder 405, left elbow 406, left wrist 407, right bottom 408, right knee 409, right ankle 410, left bottom 411, left knee 412, left ankle 413, right eye 414, left eye 415, right ear 416, and left ear 417.

The specific steps are as follows:
- (I) posture pairs of adjacent parts are established as follows: neck-right shoulder, neck-left shoulder, right shoulder-right elbow, right elbow-right wrist, left shoulder-left elbow, left elbow-left wrist, neck-right bottom, right bottom-right knee, right knee-right ankle, neck-left bottom, left bottom-left knee, left knee-left ankle, neck-nose, nose-right eye, right eye-right ear, nose-left eye, and left eye-left ear;
- (II) VGGNet is used, whose first 10 layers are used to create feature maps for the input point cloud sequence data; a two-branch multi-stage CNN is used, in which the first branch is configured to predict the body part of the teacher and obtain a 2D confidence map of the body part of the teacher, and the second branch predicts a 2D vector field of affinity of the teacher in the image, and solve the correlation between the postures of the adjacent parts according to the codes of the body parts using the coupling matching in the graph theory; and
- (III) the confidence map and affinity map obtained in step (II) are resolved by the greedy inference algorithm to obtain the key points of the body part of the teacher.

The changes in the RGB and depth data of the points in the point cloud sequence data are calculated through edge computing, so as to extract the changes in the skeletal joint points of the teacher during the teaching process.

(S3-3) Determination of Teacher's Actions

The skeletal data of the teacher transmitted are received back from the edge computing server. 3D coordinates of each joint point are extracted using the segmentation strategy. Distances between adjacent joint points and horizontal components thereof are calculated. Key nodes of the skeleton of the teacher are connected and merged using a Hungarian algorithm based on a vectorial nature of the skeleton of the teacher. The specific implementing steps are as follows:
- (I) the feature point domain of the corresponding skeletal joint points and their identical functions is calculated; the sequence of skeletal joint points is obtained based on the representation set of each identical layer in the feature point domain; the overall skeletal joint points are topologically delineated; and the adjacency matrix of joint point distribution is established; and
- (II) if the joint point G satisfies the formula (1), then it is the same skeletal layer; skeletal nodes with the maximum number of logarithmic are matched two by two, and are refined to form the skeletal category with the axis as the point of symmetry.

$$G=\{v_n|f(v_n)=g(v_{fn}), n\in(0, N)\} \quad (1);$$

where, $v_n$ is an index of a predicted value of the skeleton; $v_{fn}$ is a certain skeletal feature point; f and g are functions with $v_n$ and $v_{fn}$ as variables, respectively; and N is the total number of the skeleton.

Joint point grouping relationships are determined and aggregated into skeletons of head, neck, shoulder, elbow, hand, hip, bottom, knee, ankle, and foot using the enumerated values of the hierarchical control.

(S4) Edge Computing

The point cloud sequence data obtained by the acquisition and processing module is received. The skeletal joint points of the teacher are calculated and labeled using the nonlinear solver. The motion trajectory of the skeletal joint points is analyzed using a neural network algorithm according to moving speeds and moving angles of the skeletal joint points. The states of the teacher in the teaching activity area are detected to tracking the teaching behaviors of the teacher and the changes thereof.

(S4-1) The point cloud sequence data is received by the edge computing server using the MEC architecture. The skeletal data of the teacher in the point cloud sequence data is searched and positioned using the random decision tree and random forest algorithms. The skeletal joint points of the teacher in the point cloud sequence data are divided using the Mask R-CNN algorithm. The skeletal joint points of the teacher are calculated and labeled using the nonlinear solver. The skeletal joint points are divided through the following steps:

(I) the bottlenect structure is introduced to extract candidate skeletal joint points; the point cloud sequence data is input into the ResNet network for convolution, followed by feature fusion to obtain a multi-layer feature map; the multi-layer feature map is input uniformly into a candidate region network to obtain an interesting region of the skeletal joint points; and pixel correspondence between the feature map and the original point cloud is realized using a bi-threaded interpolation method; and (II) Mask R-CNN is used to improve the resolution of the interesting region of the skeletal joint points in the transmission of the candidate region network by inverse convolution; independent corresponding masks are generated for the skeletal points in the interesting region of the skeletal joint points according to the type and location of the candidate skeletal joint points; predictions of the masks and types of the skeletal joint points are decoupled to realize multi-branching outputs including pixel segmentation masks of the point cloud.

(S4-2) Analysis of Teaching Actions

The codes of the common teaching actions are defined according to the teaching action meaning of movement of the skeletal joint points achieved by the complete attributes. For example, actions (such as giving the OK sign, spreading thumbs, and making fists) are mapped to command types (such as OK, like, and cheer). The moving speeds and the moving angles of the body movements, the facial expressions or the hand gestures of the teacher are determined according to the skeletal joint points of the teacher at different moments on the time axis. The motion trajectory of the skeletal joint points during the teaching process is analyzed using the neural network algorithms.

(S4-3) Tracking of Behaviors of the Teacher

Figure 5:
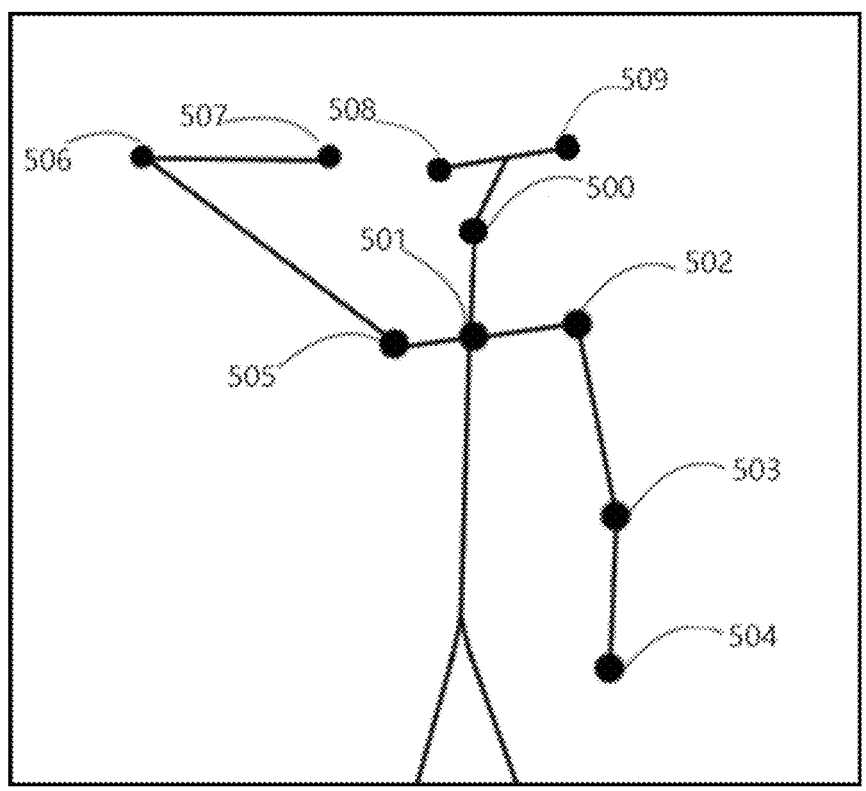
FIG. 5 is a schematic diagram of discrimination of teaching behaviors according to an embodiment of the present disclosure.

The states of the teacher in the teaching activity area are detected at different moments on the time axis using the 3D mapping and human body tracking technology, in combination with the position and connection relationship of the inverse kinematics skeletal model. The degrees of freedom of adjacent joints are calculated and examined. The behaviors of the teacher are determined and examined based on formed characteristics to track the changes in the teaching behaviors of the teacher. The teaching behaviors are identified through the following steps:

(I) the Euclidean distance between the skeletal joint points $G_1(x_1, y_1)$ and $G_2(x_2, y_2)$ is calculated based on the Euclidean distance identify features between skeletal features; points $N_1(x_{n1}, y_{n1})$ and $N_2(x_{n2}, y_{n2})$ respectively denote the left and right eye skeletal joint points and constitute the line segment $N_1N_2$, and a standard length $L_n$ is calculated by formula (2):

$$D = \sqrt{(x_1-x_2)^2 + (y_1-y_2)^2} \qquad (2);$$

the ratio value K is calculated by formula (3):

$$K = \frac{D}{L_n}; \qquad (3)$$

since the standard length $L_n$ is a spacing of two eye, and the difference in the spacing is smaller than other skeletal joints, the two eyes are subjected to the same impacts from height and object distances, and therefore can calibrate the Euclidean distance values;

(II) the skeletal joint features are extracted; as shown in FIG. 5, the wrist (left wrist 507) joint point $H_1$ and its elbow (left elbow 506) joint point $J_1$ are constructed;

the vector $\overrightarrow{J_1H_1}$ is constructed, and its vector direction w is calculated to obtain the palm orientation;

(III) the vector $\overrightarrow{K_1J_1}$ is constructed based on the elbow joint point $J_1$ and the shoulder (left shoulder 505) joint point $K_1$; an angle included by the vector $\overrightarrow{K_1J_1}$ and the vector $\overrightarrow{J_1H_1}$ and is calculated; the lengths of $K_1J_1$, $J_1H_1$, and $H_1K_1$, i.e., $L_{K1J1}$, $L_{J1H1}$, and $L_{H1K1}$, are calculated according to formula (2); and the value of the vector's angle is calculated according to formula (4) to obtain the vector's angle feature:

$$\angle K_1J_1H_1 = \cos^{-1}\frac{L_{K1J1}^2 + L_{J1H1}^2 + L_{H1K1}^2}{2 \times L_{K1J1} \times L_{J1H1}}; \qquad (4)$$

and (IV) the teaching behaviors are identified based on the skeletal joint points, the direction of movement, and the included angle.

(S5) Positioning Process

A virtuality-reality fusion coordinate system is constructed. Position, the posture and the scaling conversion coefficients of the holographic displaying content are determined according to internal and external parameters of a hologram projector. Position information and the posture information of the skeleton of the teacher in the virtuality-reality fusion coordinate system are located, in combination with an inverse perspective transformation equation. Interaction commands are determined based on the motion trajectory of the skeletal joint points of the teacher, where the interaction commands include clicking, dragging, drop, hauling and pulling;

(S5-1) Construction of the Virtuality-Reality Fusion Coordinate System

The virtuality-reality fusion coordinate system is constructed using a left-handed coordinate system, where an intersection point of the division wall, a wall of the classroom and a floor of the classroom is configured as an origin of coordinate axes; each two intersecting lines is configured as a coordinate axis; and an upward direction is configured as a positive direction of a Z-axis. As shown in FIG. 3, the skeleton of the teacher is superposed with an object model of the virtual teaching resources presented on a screen of the electronic sand table with reference to the internal and external parameters of the holographic projector, in combination of the coordinates of the skeletal joint points of the teacher and point-to-point postures. The specific steps are described as follows:
- (I) the electronic sand table detects the device serial number of the RGB-D camera connected thereto and tests whether the camera is working properly;
- (II) a human body tracker is created; and a sensor calibration structure is used to calibrate human body frames captured by the RGB-D camera based on the calculation results of the edge computing module, which includes the skeleton joint points, the human body joint index mapping and the input data stream;
- (III) input/output queues of the skeleton of the teacher are positioned in the reality-real fusion space; the newly acquired skeleton of the teacher is added to the input queue, and is then removed from the input queue after processed; and the queuing waiting time is controlled using the timeout value; and
- (IV) the background environment image and the point cloud image of the teacher are extracted to realize the superimposition of position and posture with the holographic display content.

(S5-2) Positioning of Skeletons of the Teacher

A position of each of the skeletal joint points in a virtual space is determined according to the 3D coordinate of each of the skeletal joint points obtained by the acquisition and processing module, in combination with the inverse perspective transformation equation; determine a position, a posture and a scaling parameter of each of the skeletal joint points in the virtuality-reality fusion coordinate system.

(S5-3) Determination of Interaction Commands

Hand movements, body postures and facial expression of the teacher are identified through matching tracked motion trajectory of hand, body and facial joint points of the teacher with a gesture data set, a skeleton data set and an expression data set trained by artificial intelligence (AI). The interaction commands are positioned based on changes in hand joints and elbow joints, and distance and component hierarchy relationship with a virtual teaching resource model, where the interaction commands comprise clicking, dragging, drop, hauling and pulling.

(S6) Fusion and Display

The holographic display content is rendered on the edge computing server using a cloud rendering teaching service mode. A virtual teaching resource screen displayed on the holographic screen is updated based on body positions, head postures and sight lines of the teacher. The holographic display content and the virtual teaching resource screen are fused and displayed according to position and interaction relationship between a real teacher and the virtual teaching resources.

(S6-1) Generation of Teaching Resources Using Cloud Rendering

Information of the screen, the resolution, the aspect ratio and the adapted terminal of the teaching resources is sent to a rendering module on the edge computing server via 5G WIFI/CPE based on the cloud-edge-end network architecture, after the application at the classroom end sends out a rendering request. After a rendering process is completed by the rendering module, the information is transmitted to a local end via a downstream link for viewing by the teacher and student. The holographic display of the virtual teaching content is realized through the following steps:
- (I) the eMBB network is selected, with a bandwidth of 100 MB and a connection delay requirement of 1 ms, to support transmission and computation of the holographic data in the cloud-edge-end link;
- (II) the cloud responds to the classroom terminal service request transmitted by the edge computing server, assigns 5G network slice resources according to the requirements of the screen, resolution, aspect ratio and adapted terminals, and realizes services of storage and live/on-demand/upload/distribution for the holographic content; and
- (III) after the holographic content is rendered on the edge computing server, the transmission stream is formed through the encoder and transmitted to the electronic sand table at the classroom end via the downlink, and then mapped and projected onto the holographic film.

(S6-2) Updating of the Holographic Screen

Head postures, viewpoint positions and sight directions of the teacher are calculated in real time using an observation point-center point model in graphics, according to the position, the posture and the scaling parameter of the teacher in the virtuality-reality fusion coordinate system determined by the acquisition and processing module, in response to multimodal interaction behaviors of the teacher to update the screen of the virtual teaching resources on the holographic screen.

(S6-3) Fusion and Display of the Real Teacher and the Virtual Teaching Resources A position, a posture and a scaling parameter of a content displayed on the holographic screen in the virtuality-reality fusion coordinate system are fused and displayed with the teacher in the teaching activity area to achieve fusion and display of the real teacher and the virtual teaching resources on the holographic screen by combining the head posture, the viewpoint position, the sight direction and the multimodal interaction behaviors of the teacher.

(S7) Interactive Processing

A teaching style of the teacher is recognized based on the motion trajectory, connection relationships and change sequences of the skeletal joint points of the teacher. Eye movements, body movements and gesture actions input by the teacher are recognized and converted into the interaction commands, where the interaction commands include clicking, dragging, drop, hauling and pulling. The virtual teaching resources are driven to perform operations to update a screen of the holographic display content, where the operations include moving, zooming and rotating.

(S7-1) Determination of the Teaching Style of the Teacher

The teaching style of the teacher is determined based on the motion trajectory, connection relationships and change sequences of the skeletal joint points of the teacher during the teaching process determined by the positioning module and teaching characteristics determined by the codes of the teaching actions, in combination with structural cognition, independent inquiry and types of knowledge expansion courses.

(S7-2) Identification of Interactive Actions of the Teacher

A position and a relationship between the real teacher and the virtual teaching resources during the teaching process are determined based on the head posture and the sight direction of the teacher tracked by the acquisition and processing module. In conjunction with the teaching style, the eye movements, body movements and gesture actions input by the teacher are recognized and converted into the interaction commands, where the interaction commands include clicking, dragging, drop, hauling and pulling.

(S7-3) Virtuality-Reality Linking

The virtual teaching resources are driven to perform moving, scaling and rotating operations according to the interaction commands, so as to update the screen of the holographic display content, where the interaction commands include clicking, dragging, drop, hauling and pulling. The teacher is capable of flying, going round, or walking along a fixed path to enter an interior or exterior of the virtual teaching resources to explore texture details and characteristic distributions of a surface of the virtual teaching resources.

The contents not described in detail in this application belong to the prior art known to those skilled in the art.

It is easily understood by those skilled in the art that the described above are merely preferred embodiments of the present disclosure, and are not intended to limit the present disclosure. Any modifications, equivalent replacements and improvements made within the spirit and principles of the present disclosure shall be included in the scope of protection of the present application.

What is claimed is:

1. A three-dimensional (3D) integrated teaching field system based on a flipped platform, comprising:
   a device deployment module;
   a teaching resource matching module;
   an acquisition and processing module; and
   an edge computing module;
   wherein the device deployment module is configured to deploy displaying, acquiring, computing and interactive devices and a lighting system in a teaching activity area in a classroom to support the 3D integrated teaching field system;
   the teaching resource matching module is configured to select a teaching resource according to an instruction requested by a user in accordance with a weighting order of parameters, and realize a loading service of virtual teaching resources along a cloud-edge-end link based on local caching, hot updating by using an edge computing server, and cloud batch updating;
   the acquisition and processing module is configured to acquire environment of the teaching activity area and point cloud sequence data of a teacher using a red-green-blue-depth (RGB-D) camera, extract skeleton data of the teacher using a Mask region-based convolutional neural network (R-CNN) algorithm on the edge computing server, and feed the skeleton data back to a local processing module to extract skeletal joint points of the teacher and coordinates of the skeletal joint points of the teacher to perform grouping of the skeletal joint points; and
   the edge computing module is configured to receive the point cloud sequence data obtained by the acquisition and processing module, calculate and label the skeletal joint points of the teacher, analyze a motion trajectory of the skeletal joint points, detect states of the teacher in the teaching activity area, and track teaching behaviors of the teacher and changes thereof;
   wherein the skeletal joint points of the teacher are calculated and labeled through steps of:
      receiving, by the edge computing server, the point cloud sequence data obtained by the acquisition and processing module using a mobile edge computing (MEC) architecture; searching and positioning the skeletal data of the teacher in the point cloud sequence data using a random decision tree algorithm and a random forest algorithm; segmenting skeletal joints of the teacher in the point cloud sequence data using the Mask R-CNN algorithm; and calculating and labeling the skeletal joint points of the teacher using a nonlinear solver;
   the motion trajectory of the skeletal joint points is analyzed through steps of:
      defining codes of common teaching actions according to teaching action meaning of movement of the skeletal joint points; determining moving speeds and angles of body movements, facial expressions or hand gestures of the teacher according to the skeletal joint points at different moments on a time axis; and analyzing the motion trajectory of the skeletal joint points during a teaching process using a neural network algorithm; and
   the teaching behaviors of the teacher and the changes thereof are tracked through steps of:
      detecting states of the teacher in the teaching activity area at different moments on the time axis using 3D mapping and human body tracking technology, in combination with position and connection relationship of an inverse kinematics skeletal model; calculating and examining degrees of freedom of adjacent joints;
   and determining and examining behaviors of the teacher based on formed characteristics to track changes in the teaching behaviors of the teacher.

2. The 3D integrated teaching field system of claim 1, further comprising:
   a positioning module;
   wherein the positioning module is configured to construct a virtuality-reality fusion coordinate system, determine position, posture and scaling factor of a holographically-displayed content, determine position information and posture information of the skeleton of the teacher, and position an interaction command based on the motion trajectory of the skeletal joint points of the teacher.

3. The 3D integrated teaching field system of claim 1, further comprising:
   a display module;
   wherein the display module is configured to push a virtual teaching content screen rendered by the edge computing server to a local area, update a virtual teaching resource screen on a holographic screen according to observation parameters of the teacher, and realize fusion and display of the virtual teaching content screen according to position and interaction relationship between the teacher and the virtual teaching resources.

4. The 3D integrated teaching field system of claim 1, further comprising:
   an interaction module;
   wherein the interaction module is configured to recognize a teaching style of the teacher based on the motion trajectory, connection relationships and change sequence of the skeletal joint points of the teacher, recognize a multi-sensory action input by the teacher, convert the multi-sensory action into an interaction command to drive the virtual teaching resources to perform operations, and update a screen of holographically-di splayed content.

5. A method for operating the 3D integrated teaching field system of claim 1, comprising:
   (S1) dividing a classroom into the teaching activity area of the teacher and a student activity area with a division wall embedded with a holographic film and an entry door; constructing a 3D teaching field system for the classroom using an electronic sand table, the edge computing server, a holographic imaging device and lights; and deploying a device integrating depth, sound, motion capture and touch sensing in the teaching activity area;

(S2) selecting a teaching resource according to subjects, grades, textbook versions and knowledge points requested by the user in accordance with a weighting order of terminal, resolution and ratio; constructing the cloud-edge-end link to download the virtual teaching resources according to requests of the user; and realizing the loading service of the virtual teaching resources according to the local caching, the hot updating by using the edge computing server, and the cloud batch updating;

(S3) acquiring, by the RGB-D camera, background, texture, depth and point cloud of the teaching activity area; uploading the background, the texture, the depth and the point cloud to the edge computing server; extracting the skeleton data of the teacher using the Mask R-CNN technology; and extracting, in the local processing module, the coordinates of skeleton and skeletal joint points of the teacher using a segmentation strategy to perform the grouping of the skeletal joint points based on a hierarchical control principle;

(S4) receiving the point cloud sequence data obtained by the acquisition and processing module; calculating and labeling the skeletal joint points of the teacher using the nonlinear solver; analyzing the motion trajectory of the skeletal joint points using a neural network algorithm according to moving speeds and moving angles of the skeletal joint points; and detecting the states of the teacher in the teaching activity area to track the teaching behaviors of the teacher and the changes thereof; wherein step (S4) comprises:

(S4-1) receiving, by the edge computing server, the point cloud sequence data obtained by the acquisition and processing module using the MEC architecture; searching and positioning the skeletal data of the teacher in the point cloud sequence data using the random decision tree algorithm and the random forest algorithm; segmenting the skeletal joints of the teacher in the point cloud sequence data using the Mask R-CNN algorithm; and calculating and labeling the skeletal joint points of the teacher using the nonlinear solver;

(S4-2) defining the codes of the common teaching actions according to the teaching action meaning of movement of the skeletal joint points achieved by the complete attributes; determining the moving speeds and the moving angles of the body movements, the facial expressions or the hand gestures of the teacher according to the skeletal joint points at different moments on the time axis; and analyzing the motion trajectory of the skeletal joint points during the teaching process using the neural network algorithm; and (S4-3) detecting the states of the teacher in the teaching activity area at different moments on the time axis using the 3D mapping and human body tracking technology, in combination with the position and connection relationship of the inverse kinematics skeletal model; calculating and examining the degrees of freedom of adjacent joints; and determining and examining the behaviors of the teacher based on formed characteristics to track the changes in the teaching behaviors of the teacher; and (S5) constructing a virtuality-reality fusion coordinate system; determining position, the posture and the scaling factor of a holographically-displayed content according to internal and external parameters of a hologram projector; locating position information and the posture information of the skeleton of the teacher in the virtuality-reality fusion coordinate system, in combination with an inverse perspective transformation equation; and determining an interaction command based on the motion trajectory of the skeletal joint points of the teacher, wherein the interaction commands comprise clicking, dragging, drop, hauling and pulling;

(S6) rendering the holographic display content on the edge computing server using a cloud rendering teaching service mode; updating a virtual teaching resource screen displayed on the holographic screen based on body positions, head postures and sight lines of the teacher; fusing and displaying the virtual teaching content screen and the virtual teaching resource screen according to position and interaction relationship between the teacher and the virtual teaching resources; and (S7) recognizing a teaching style of the teacher based on the motion trajectory, connection relationships and change sequences of the skeletal joint points of the teacher; recognizing a multi-sensory action input by the teacher, wherein the multi-sensory action comprises eye movements, body movements and gesture actions; converting the multi-sensory actions into the interaction commands; and driving the virtual teaching resources to perform operations to update a screen of the holographically-displayed content, wherein the operations comprise moving, zooming and rotating.

6. The method of claim 5, wherein step (S1) comprises:

(S1-1) arranging the division wall 3 m in front of a blackboard or an electronic whiteboard in the classroom, so as to divide the classroom into the teaching activity area and the activity area of the student, wherein the division wall is embedded with a glass screen attached with the holographic film and the entry door; the teaching activity area is located inside the division wall and near the blackboard, and the activity area of the student is located outside the division wall; and the teacher is capable of talking with the student face to face by walking to the activity area of the students from the teaching activity area through the entry door;

(S1-2) constructing a holographic display environment, wherein the glass screen embedded in the division wall is configured to present fusion effect of the virtual teaching resources and the teacher; an ultra-short-focus holographic projector is installed in a middle of a top of the activity area of the student, with an initial position being set in a middle of a mobile guide rail; and LED lamps and LED flat soft lights are used as light sources according to needs of teacher's operation in the teaching activity area and students' viewing in the activity area of the student, respectively, wherein the LED lamps and the LED flat soft lights are different in brightness;

(S1-3) deploying the edge computing server, the electronic sand table and network environment in the teaching activity area, wherein the electronic sand table is configured to load and control teaching sources during the teaching process; arranging the RGB-D camera integrating time-of-flight (TOF) depth, microphone circular array and inertial measurement unit on a top of the teaching activity area, to collect voice, mouth shapes and the body movements of the teacher during the teaching process.

7. The method of claim 5, wherein step (S2) comprises:
(S2-1) establishing a knowledge tree model of the teaching resources according to the subjects, grades, the textbook versions, chapters and the knowledge points; attaching the teaching resources to the knowledge tree model according to media types; assigning adaptable terminals, screen sizes and aspect ratios to the teaching resources; determining the most compatible teaching resources according to user's requests in the weighting order of the terminal, the resolution, and ratio attributes;
(S2-2) constructing the cloud-edge-end link using the MEC architecture; deploying a rendering and teaching service module of the 3D comprehensive teaching field in the cloud to realize services of user information, resource matching and function validation; deploying the edge computing server in a school to which the classroom belongs to, so as to realize services of screen rendering, edge computing and resource updating; and downloading the virtual teaching resources from a classroom end based on instruction requests issued by the teacher; and
(S2-3) sending a request for loading the teaching resources from a teaching application of the electronic sand table according to teaching objectives and teaching content requirements; and loading the teaching resource on the electronic sand table.

8. The method of claim 5, wherein step (S3) comprises:
(S3-1) setting a field mode of the RGB-D camera to a narrow view, with a central field area front of the electronic sand table; accurately acquiring background environment of the teaching activity area and texture images and depth point cloud sequence data of the teacher during the teaching process; and transmitting the background environment, the texture images and the depth point cloud sequence data to the acquisition and processing module on the electronic sand table through Bluetooth, WIFI or USB 3.0;
(S3-2) sending, by the acquisition and processing module, the depth point cloud sequence data captured by the RGB-D camera to the edge computing server according to time sequence; extracting a two-dimensional (2D) confidence map and an association field of a transformed image using the Mask R-CNN neural network technology, and solving connection between the 2D confidence map and the association field using bipartite matching in graph theory; extracting the skeleton data of the teacher in the point cloud sequence data; and extracting the changes in the skeletal joints of the teacher during the teaching process according to changes in RGB and depth data of points in the point cloud sequence data though edge computing;
(S3-3) receiving the skeletal data of the teacher transmitted back from the edge computing server; extracting 3D coordinates of each joint point using the segmentation strategy; calculating distances between adjacent joint points and horizontal components thereof; and connecting and merging key nodes of the skeleton of the teacher using a Hungarian algorithm based on a vectorial nature of the skeleton of the teacher.

9. The method of claim 5, wherein step (S5) comprises:
(S5-1) constructing the virtuality-reality fusion coordinate system, wherein an intersection point of the division wall, a wall and a floor of the classroom is configured as an origin of coordinate axes; each two intersecting lines is configured as a coordinate axis; and an upward direction is configured as a positive direction of a Z-axis; superposing the skeleton of the teacher with an object model of the virtual teaching resources presented on a screen of the electronic sand table using the virtuality-reality fusion coordinate system constructed by a left-handed coordinate system with reference to the internal and external parameters of the holographic projector, in combination of the coordinates of the skeletal joint points of the teacher and point-to-point postures;
(S5-2) determining a position of each of the skeletal joint points in a virtual space according to the 3D coordinate of each of the skeletal joint points obtained by the acquisition and processing module, in combination with the inverse perspective transformation equation; determine a position, a posture and a scaling parameter of each of the skeletal joint points in the virtuality-reality fusion coordinate system; and
(S5-3) identifying hand movements, body postures and facial expression of the teacher through matching tracked motion trajectory of hand, body and facial joint points of the teacher with a gesture data set, a skeleton data set and an expression data set trained by artificial intelligence (AI); and positioning the interaction commands based on changes in hand joints and elbow joints, and distance and component hierarchy relationship with a virtual teaching resource model, wherein the interaction commands comprise clicking, dragging, drop, hauling and pulling.

10. The method of claim 5, wherein step (S6) comprises:
(S6-1) sending information of the screen, the resolution, the aspect ratio and the adapted terminal of the teaching resources to a rendering module on the edge computing server via 5G WIFI/CPE based on the cloud-edge-end network architecture, after the application at the classroom end sends out a rendering request; and after a rendering process is completed by the rendering module, transmitting the information to a local end via a downstream link for viewing by the teacher and student;
(S6-2) calculating a current head posture, viewpoint position and sight direction of the teacher in real time using an observation point-centre point model in graphics, according to the position, the posture and the scaling parameter of the teacher in the virtuality-reality fusion coordinate system determined by the acquisition and processing module, in response to multi-modal interaction behaviors of the teacher to update the screen of the virtual teaching resources on the holographic screen; and
(S6-3) superimposing and displaying a position, a posture and a scaling parameter of a content displayed on the holographic screen in the virtuality-reality fusion coordinate system with the teacher in the teaching activity area; and achieving fusion display of the real teacher and the virtual teaching resources on the holographic screen by combining the head posture, the viewpoint position, the sight direction and the multi-modal interaction behaviors of the teacher.

11. The method of claim 5, wherein step (S7) comprises:
(S7-1) recognizing the teaching style of the teacher based on the motion trajectory, connection relationships and change sequences of the skeletal joint points of the teacher during the teaching process determined by the positioning module and teaching characteristics determined by the codes of the teaching actions, in combination with structural cognition, independent inquiry and types of knowledge expansion courses;

(S7-2) determining a position and a relationship between the real teacher and the virtual teaching resources during the teaching process based on the head posture and the sight direction of the teacher tracked by the acquisition and processing module; recognizing and converting the multi-sensory actions input by the teacher into the interaction commands in conjunction with the teaching style, wherein the multi-sensory actions comprise eye movements, body movements and gesture actions; and the interaction commands comprise clicking, dragging, drop, hauling and pulling; and (S7-3) driving the virtual teaching resources to perform moving, scaling and rotating operations according to the interaction commands, so as to update the screen of the holographic display content, wherein the teacher is capable of flying, going round, or walking along a fixed path to enter an interior or exterior of the virtual teaching resources to explore texture details and characteristic distributions of a surface of the virtual teaching resources.

\* \* \* \* \*